Figure 1:
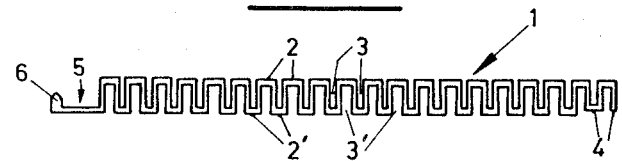

Feb. 21, 1967  H. DE MOUSTIER  3,304,682
CONNECTION BETWEEN SHAPED ELEMENTS
Filed March 24, 1964  2 Sheets-Sheet 1

Feb. 21, 1967   H. DE MOUSTIER   3,304,682
CONNECTION BETWEEN SHAPED ELEMENTS
Filed March 24, 1964   2 Sheets-Sheet 2
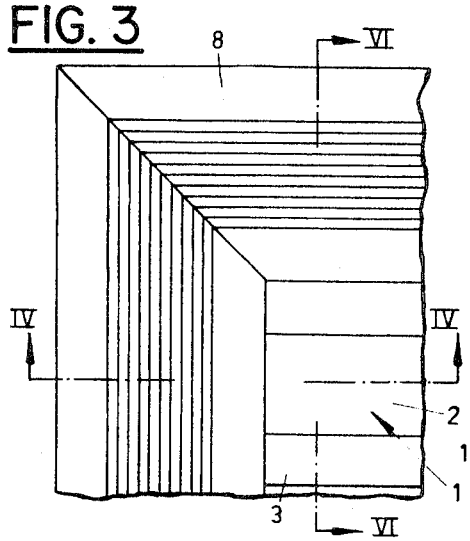
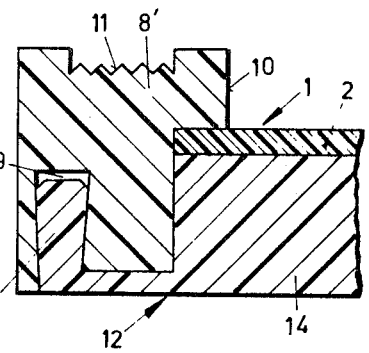
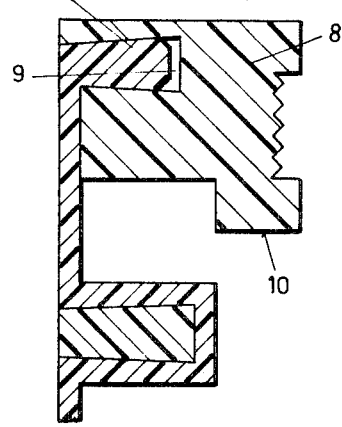
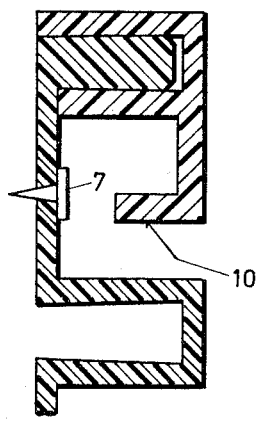
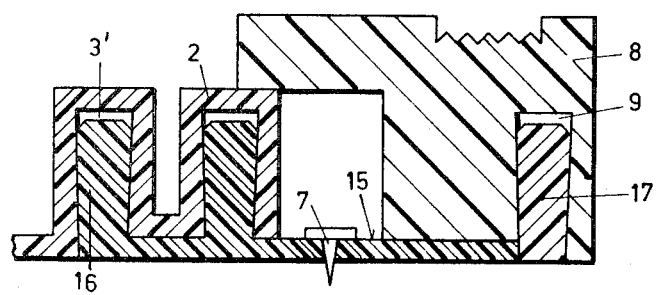

United States Patent Office 3,304,682
Patented Feb. 21, 1967

3,304,682
CONNECTION BETWEEN SHAPED ELEMENTS
Henri de Moustier, Toulon, France, assignor to
Plastival S.A., Clerval, Doubs, France
Filed Mar. 24, 1964, Ser. No. 354,337
Claims priority, application France, Mar. 27, 1963,
929,490
2 Claims. (Cl. 52—475)

The present invention has for its object a shaped element, made preferably of thermoplastic material.

According to the invention, the transverse cross-section of said shaped element has an outline constituted by a winding succession of receding and projecting sections, after the manner of a Greek border while securing means are provided for connecting one end of the outline with the opposite end of the adjacent outline whereby the assembly of several elements shows on one side an uninterrupted sequence of receding and projecting sections which are all equal and joining means are provided for inserting an element or the assembly of several elements inside a frame.

Figure 2:
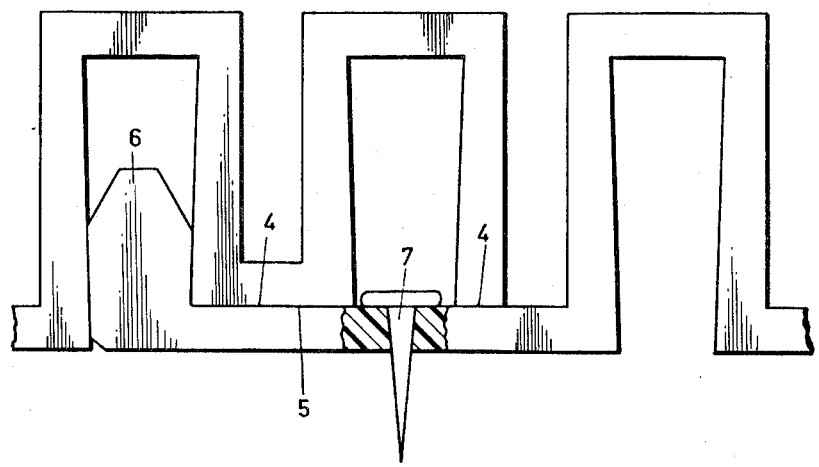
Figure 5:
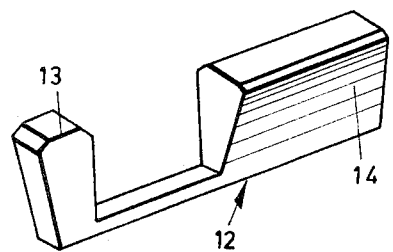

The accompanying drawings illustrate, by way of example and in a non-limiting sense, a preferred embodiment of said invention. In the drawings:

FIG. 1 is a sectional view of a shaped element,

FIG. 2 is a sectional view, on a larger scale, of the connection between two elements made in accordance with FIG. 1, FIG. 3 is a partial plan view of a frame adapted to hold in position one or more shaped elements, FIG. 4 is a sectional view through line IV—IV of FIG. 3, FIG. 5 is a perspective view of a detail of FIG. 4, FIG. 6 is a sectional view through line VI—VI of FIG. 3, FIG. 7 is a sectional view of a part of the frame located symmetrically to that illustrated in FIG. 6, FIG. 8 illustrates a modification of the side of the frame illustrated in FIGS. 3 to 7.

Turning to FIG. 1, the latter shows a shaped element including to either side a succession of projecting sections 2, 2' and of receding sections 3, 3', which succession is formed by a winding strip of thermoplastic material. These projecting and receding sections extend longitudinally in planes perpendicular to the plane of the drawing. The pitch of the element is defined by the distance separating the medial points of two successive receding sections or projecting sections. The right hand side of the element stops at the outer end of a projecting section 2 while the lower ends 4 of the last recessed section 3' and the last projecting section 2' at the same end are positioned at the lower surface of the element by an amount corresponding to the thickness of its wall. The left-hand end of the element includes an extension 5 terminating with a tenon 6 of which the breadth registers with the inside of recessed section 3'. The spacing between the opposite surfaces of the tenon 6 and of the last projecting section 2 on the flat surface 5 is equal the pitch of said element increased by the breadth of a recessed section 2 and by the thickness of its wall.

FIG. 2 shows two interconnected elements. The tenon 6 of the right-hand element engages with a force fit the recessed section 3' preceding the last recessed section of the left-hand element. The inwardly positioned lower ends 4 of the right hand element engage the flat surface 5 of the right-hand element. A securing nail 7 secures the elements on a support which is not illustrated and is urged into the flat surface 7. The last projection section 2 of the left element covers then the latter in the manner such that the upper surface of the elements show a uniform succession of projecting and recessed sections which are all of the same breadth.

Of course, the connection between the two elements may be obtained in a simpler manner by engaging the tenon 6 inside the last recessed section 3' of the left-hand element. The flat section of the right-hand element would then be of a reduced length and the distance separating the opposite surfaces of the tenon and of the projecting section on said flat section would be equal only to the breadth of a recessed section 3 increased by the thickness of the wall of the element.

The shaped element or a plurality of shaped elements assembled so as to form a rectangle may be fitted inside a frame. FIG. 3 shows a corner section of said frame including its edges 8 and 8 adjacent an element 1. The corner of the frame connects the two edges which are perpendicular to each other and the ends of which are bevelled at an angle of 45°. The sections of the edges of the frame are all identical. In the embodiment illustrated in FIG. 4 such an edge has a recess or housing 9, a front surface inside the frame 10 and an ornamental outline 11. In the modification illustrated in FIG. 8, the edge of the frame is lighter. Its upper surface is flat and its outline is recessed so as to limit the amount of material required for its execution.

The edge or side 8' illustrated in FIG. 4 is positioned along a transverse surface of the elements. It is secured to the latter by means of connecting members 12 illustrated separately in FIG. 5 and of which one end is provided with a tenon 13 while its other end 14 is of a prismatic elongated shape. Said connecting member is secured, on the one hand, through its tenon 13 inside the housing 9 provided in the edge 8' and, on the other hand, through its end 14 in a recessed section 2' of an adjacent element. Thus, the edge 8' is secured to the transverse surfaces of the elements adjacent the frame through at the utmost as many connecting members as there are elements provided with recessed sections 2'.

The edge illustrated in FIG. 6 extends along longitudinal surfaces of the elements, which surfaces are provided with the tenon 6 described with reference to FIG. 1. It is secured to the latter through its housing 9 fitted over the tenon 6 of the element. The opposite, parallel edge 8 of the frame engages the other longitudinal surfaces of the elements which are provided with a projecting section 2. A connecting member 15 provided at each end with a tenon 16, 17 is connected through one tenon 16 introduced into the recessed section 3' and through the other tenon 17 fitted in the housing 9, with the adjacent element and edge respectively.

The front surfaces 10 of the edges adjacent the transverse surfaces of the shaped elements, cover at least a fraction of the latter (FIG. 4). In contradistinction, the front surfaces 10 of the edges adjacent longitudinal surfaces of the shaped elements can stop short of the first projecting section 2 at a distance corresponding to the breadth of a hollow section 3 (FIGS. 6 and 8) or else they may extend beyond said projecting section so as to cover the latter partly (FIG. 7). A nail 7 may in each case secure onto a support, which is not illustrated, the element or connecting member adjacent the edge. It is completely concealed by the front surfaces 10 of the edges which extend over the first projecting sections.

According to a modification which is not illustrated, the recessed or projecting sections appearing on one of the surfaces of the shaped elements may be pitted, in which case the tenon formed at one of the ends of a shaped element and securing together two adjacent elements is castellated or milled.

According to another modification which is not illustrated, the outline of a shaped element may be given a generally curvilinear shape, in which case the tenons securing two adjacent elements together and also the tenons of the connecting members match the particular shape of the recessed sections.

In all cases, the introduction of a tenon inside a recessed section is made by a force fit while the securing of adjacent elements together or of the edges of a frame along such elements, is obtained through the mere elasticity of the material forming the shaped elements, the connecting joining members and/or the edges of the frame.

A shaped element or the assembly of several shaped elements inside a frame, may form a panel carrying synoptic information or serve for the removable securing or positioning of various articles or an ornamental covering of surfaces. It is applicable at all points where it is necesary to show information liable to modifications as in the case of inlet panels, planification boards, school boards, poster supports, or when it is used as a support for different articles; it may also serve as a key-board or else it may be arranged horizontally and serve as means for classifying cards or again it may form a support for children's games. As an ornamental cover, the shaped elements disclosed provided with a frame or otherwise, may serve for the ornamentation of any premises or of outer walls. Other possible applications are to be considered without it being necessary to draw any list thereof.

Obviously the present invention is by no means limited to the embodiment described and disclosed in the drawings and it may be modified within the scope of the accompanying claims.

What I claim is:

1. A structure comprising a system of successive coplanar shaped elements having longitudinal edges the transverse cross-section of said elements being defined by a winding outline constituted by a succession of projecting and recessed sections having generally flat portions, means carried along one longitudinal edge of each element and engaging a recessed section in the adjacent element, a quadrangular frame of a uniform cross-section including four sides each provided with a longitudinal housing and securing means consisting of a tenon engaging said housing in the corresponding lateral side of the frame and an elongated prismatic extension engaging longitudinally a recessed section in a corresponding element thereby to hold the elements enclosed within the frame.

2. A structure comprising a system of successive, coplanar shaped elements having longitudinal edges, said elements having a transverse cross-section defined by a winding outline constituted by a succession of projecting and recessed sections having generally flat portions, means carried along one longitudinal edge of each element and engaging a recessed section in the adjacent element, a quadrangular frame of a uniform cross-section having four sides each provided with a housing longitudinal of said side, two of said sides being longitudinal with respect to said shaped elements, and two of said sides being transverse with respect to said shaped elements, said one longitudinal edge of an element lying adjacent to one of the longitudinal frame sides with said means carried by said one longitudinal edge engaged in said housing of said one longitudinal side, the inner edge of said one longitudinal side projecting inwardly and stopping short of the adjacent projecting section of said adjacent shaped element by a distance equal to the breadth of one recess section, and securing means engaging the housings in the transverse frame side and engaging recessed section in said shaped elements to secure said transverse frame side.

References Cited by the Examiner

UNITED STATES PATENTS

| Re. 24,613 | 3/1959 | Hageltorn | 161—116 |
|---|---|---|---|
| 2,593,221 | 4/1952 | Thompson | 52—471 |
| 2,824,341 | 2/1958 | Ashton | 52—627 |
| 3,111,203 | 11/1963 | De Ridder | 52—588 |
| 3,203,149 | 8/1965 | Soddy. | |
| 3,234,697 | 2/1966 | Toti | 52—627 |

FOREIGN PATENTS

| 213,031 | 1961 | Austria. |
|---|---|---|
| 849,766 | 1939 | France. |

FRANK L. ABBOTT, *Primary Examiner.*

R. A. STENZEL, C. MUELLER, *Assistant Examiner.*